United States Patent
Schirmer et al.

(10) Patent No.: US 12,553,721 B2
(45) Date of Patent: Feb. 17, 2026

(54) MOBILE APPLICATION FOR FLIGHT LOGGING

(71) Applicant: NimboSys, LLC, Viola, KS (US)

(72) Inventors: Georg Schirmer, Viola, KS (US); Alok Menon, Wichita, KS (US)

(73) Assignee: NimboSys, LLC, Viola, KS (US)

( * ) Notice: Subject to any disclaimer, the term of this patent is extended or adjusted under 35 U.S.C. 154(b) by 436 days.

(21) Appl. No.: 17/881,412

(22) Filed: Aug. 4, 2022

(65) Prior Publication Data

US 2023/0046336 A1 Feb. 16, 2023

Related U.S. Application Data (60) Provisional application No. 63/229,371, filed on Aug. 4, 2021.

(51) Int. Cl.
*G01C 21/20* (2006.01)
*B64D 45/00* (2006.01)

(52) U.S. Cl.
CPC .......... *G01C 21/20* (2013.01); *B64D 45/00* (2013.01)

(58) Field of Classification Search
CPC ...... G01C 21/20; B64D 45/00; G08G 5/0091; G08G 5/0013; G08G 5/0021
See application file for complete search history.

(56) References Cited

U.S. PATENT DOCUMENTS

| | | | | |
|---|---|---|---|---|
| 6,868,320 | B1* | 3/2005 | Burch | G01C 23/00 701/14 |
| 8,700,236 | B1* | 4/2014 | Berman | G07C 5/008 701/16 |
| 10,972,872 | B2* | 4/2021 | Gandrud | G08B 25/008 |
| 2011/0125454 | A1* | 5/2011 | Wengler | G01P 13/00 702/141 |

OTHER PUBLICATIONS

LogTen Pro Pilot Logbook, Coradine Aviation Systems, coradine. com, Nov. 1, 2020, 26 pages.

\* cited by examiner

*Primary Examiner* — Aniss Chad
*Assistant Examiner* — Nikki Marie M Molina
(74) *Attorney, Agent, or Firm* — Stinson LLP (57) ABSTRACT

Systems and methods for logging flight time in one or more digital logbooks employ an application that runs on mobile devices to determine when aircraft takeoff and aircraft landings have occurred. Indications of the determined aircraft takeoff and an indication of the determined aircraft landing are stored in memory. The mobile devices send determined aircraft takeoffs and aircraft landings to a data management server, which queries an official flight data source for office flight records that correspond to the determined aircraft takeoffs and determined aircraft landings. The mobile device, via the mobile application, requests confirmation of whether the user was a required flight crew member on a flight corresponding to the determined aircraft takeoff and the determined aircraft landing.

8 Claims, 9 Drawing Sheets

MOBILE APPLICATION FOR FLIGHT LOGGING

CROSS-REFERENCE TO RELATED APPLICATION

This patent application claims priority to U.S. Provisional Patent Application No. 63/229,371, filed Aug. 4, 2021, and entitled MOBILE APPLICATION FOR FLIGHT LOGGING, which is hereby incorporated by reference in its entirety for all purposes.

FIELD

The present disclosure generally relates to mobile applications for logbook entry, and more specifically, to a method of flight logging via a mobile application using a mobile device.

BACKGROUND

Logging flight time is essential to every pilot worldwide and mandatory in some countries. Oftentimes seen as a tedious and cumbersome process, the act of documenting one's own aeronautical experience is necessary and yet neglected by many pilots. Important experience parameters such as, but not limited to total flight time, instrument time and landings performed, are not only associated with meeting minimum thresholds for advanced ratings, but also prove proficiency and currency. A pilot's logbook embodies the portfolio of a pilot's work when applying for jobs in a competitive market. Historically, pilots recorded their flight time manually in paper logbooks. However, the dawn of advanced consumer electronics introduced electronic logbooks to digitally preserve their logged flight time. These electronic logbooks range from simple excel spreadsheets to feature rich mobile applications, all designed to collect manual pilot inputs and display the data in various customizable ways at the pilots' request. However, these electronic logbooks have very limited or no automation and require detailed, manual flight data input by the pilot after every flight. This not only increases a pilot's workload but also results in clerical errors, inaccuracies, or oversights. No logbook currently available performs any validation to assure data accuracy. Therefore, there is a need for a mobile flight log application, capable of performing flight tracking tasks automatically, validating and augmenting the collected flight data with independent 3rd party data sources, thereby assuring the highest level accuracy without the need of pilot input.

SUMMARY

In one aspect, a method of logging flight time in a digital logbook comprises determining, via a mobile device of a user, that an aircraft takeoff and an aircraft landing has occurred. An indication of the determined aircraft takeoff and an indication of the determined aircraft landing are stored in memory. Via the mobile device and based on the indication of the determined aircraft takeoff and the indication of the determined aircraft landing, confirmation is requested of whether the user was a required flight crew member on a flight including the determined aircraft takeoff and the determined aircraft landing.

In another aspect, a system for logging flight time of a plurality of users comprises a data management server and a plurality of mobile devices. Each mobile device is associated with a respective one of the users. Each of the mobile devices runs a mobile application that allows the mobile device to determine aircraft takeoffs and aircraft landings. Each of the mobile devices is configured to send the determined aircraft takeoffs and aircraft landings to the data management server. The data management server is configured to query an official flight data source for a record of a flight having a takeoff and a landing that correspond to the determined aircraft takeoffs and determined aircraft landings from the plurality of mobile devices.

Other aspects and features will be apparent hereinafter.

BRIEF DESCRIPTION OF THE DRAWINGS

Corresponding parts are given corresponding reference characters throughout the drawings.

DETAILED DESCRIPTION

The present disclosure provides a description of a mobile application-based system for tracking or logging flight time, or more generally, flights, in an automated manner. As will become apparent, the mobile application according to the present disclosure enables a method of tracking flight time in a digital logbook by which a mobile device of a user determines (e.g., based on GPS) that an aircraft takeoff (departure) and aircraft landing (arrival) have occurred-more particularly, that the mobile device was present for an aircraft takeoff and an aircraft landing. In response to making this determination, the mobile device stores in memory an indication of the determined aircraft takeoff and an indication of the determined aircraft landing. Such indications may include airport codes for the airports from which the takeoff and/or landing occurred, as well as the time and/or date at which the takeoff and/or landing occurred. Once such takeoff and landing have occurred, all pertinent flight data is stored to the user's database as a completed flight. Subsequently, a web server for the mobile application queries a third-party flight data source for a record of a flight with matching takeoff and landing locations and times, operated by the user-specified carrier. Along with official flight information (e.g., a flight number, (ii) an official flight time (OOOI times), (iii) an aircraft registration, and/or (iv) weather data), computed flight times (e.g., (v) instrument time, (vi) night time and (vii) day time) are updated for the corresponding flight. Flights which were successfully recorded and stored are initially tagged for review and displayed under the review section of the logbook. If the user affirms the flight, the mobile application prompts the user to indicate whether the user conducted the landing, and stores landing credit accordingly. The application then changes from a state of the flight requiring review to an approved state and subsequently displays this flight in the pilot's logbook section.

Figure 1:
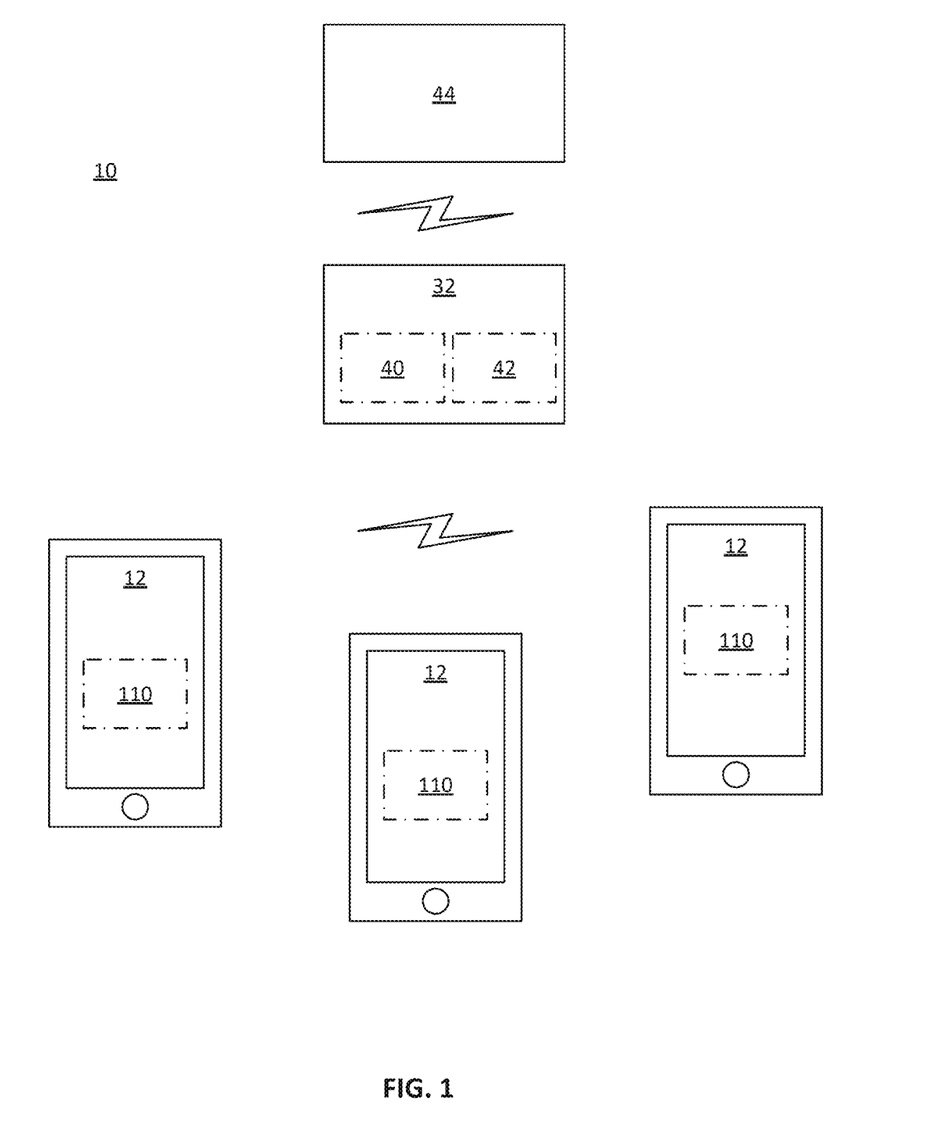
FIG. 1 is a schematic block diagram of a web services system enabling a mobile flight logging application of the present disclosure.

Referring to FIG. 1, an exemplary embodiment of a mobile application system 10 includes a data management server 32 and a plurality of mobile devices 12, each associated with a different user of the flight logging system. In accordance with the present disclosure, each mobile device 12 runs the mobile flight log application that enables the mobile device to determine or recognize aircraft takeoffs and aircraft landings. Each mobile device comprises a local memory that stores a data structure 110 (described below) that is used by the algorithm 210 to detect takeoffs and landings based on the mobile device's internal and/or optional external sensors. The server 32 comprises flight record database 40 that stores records of flights detected for each of the users. However, it will be understood that the flight record database can be stored in local memory on the mobile device, in one or more embodiments. Furthermore, the server 32 comprises an authentication system 42 that authenticates each user. A third-party data source 44 is queried by the data management server 32 when a new flight is added to the user database 40. The data obtained from 44 is used to augment and validate the recorded flight data.

It is expressly contemplated that mobile devices 12 in the flight logging system 10 will comprise onboard GPS, accessible to the mobile application. That is, the mobile application will receive periodic GPS locations from the onboard GPS. As will be explained in further detail below, the mobile application is configured to use the onboard GPS to determine device locations and/or speeds of travel. In certain embodiments, mobile devices 12 also have onboard inertial sensors, such as onboard gyroscopes or accelerometers. In one or more embodiments, the mobile application may access the onboard inertial sensors for purposes of monitoring the motion of the mobile device.

As a general preview, the mobile application on each mobile device 12 is configured to use the GPS of the mobile device to validate occurrences of the mobile device becoming stationed for an appreciable length of time at an airport location. Then, based on changes from one validated airport station to the next, the mobile application is configured to make determinations of aircraft takeoffs and aircraft landings (broadly, determinations of flights) as they occur. The mobile application-determined aircraft takeoffs and landings are then compared to a third-party flight record database 44 to determine an official flight record that matches the determined aircraft takeoff and landing. For example, the official flight data source 44 can comprise a U.S. Department of Transportation (DOT) database. The server then stores a record of the matching official flight (e.g., (i) a flight number, (ii) an official flight time, (iii) an aircraft registration, and (iv) weather data) to the flight record database 40.

Figure 3:
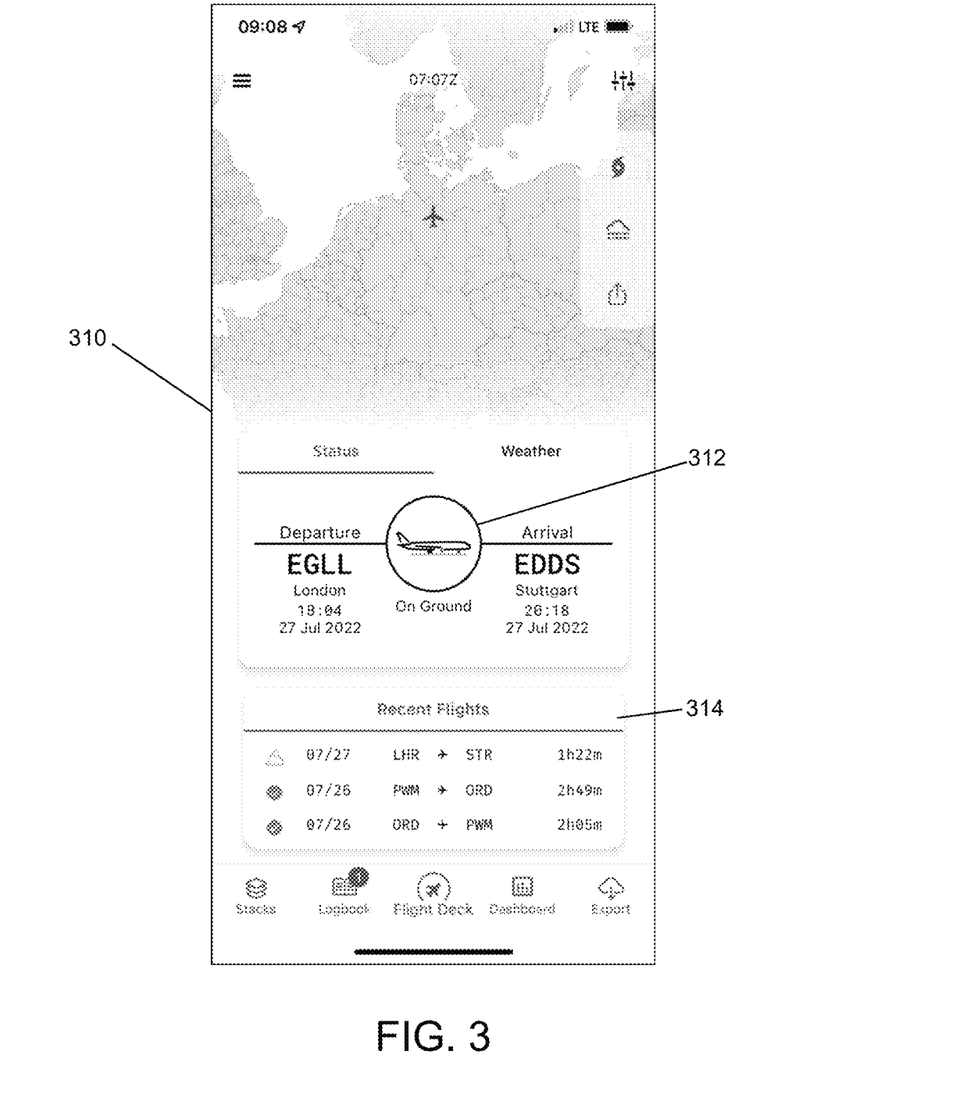
FIG. 3 is a screenshot of a flight deck view of the mobile application.
Figure 4A:
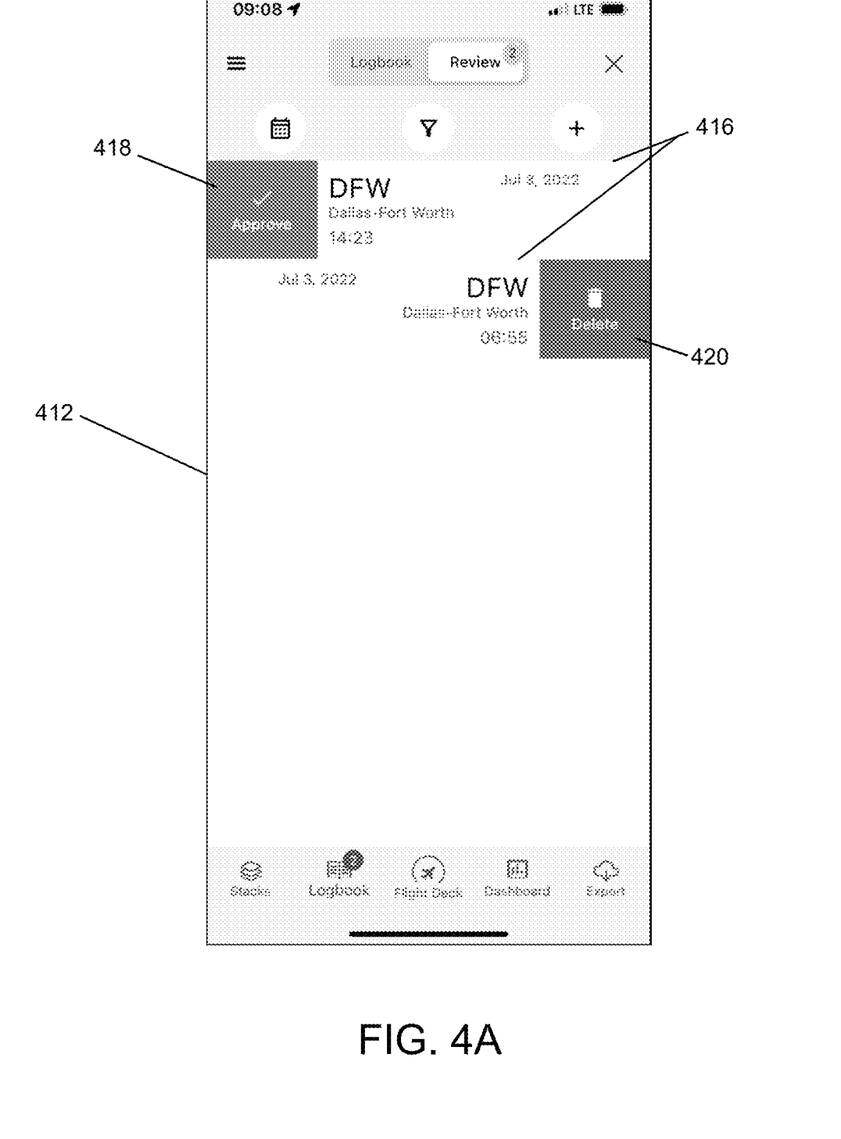
FIG. 4A is a screenshot of a review screen of the mobile application.
Figure 4B:
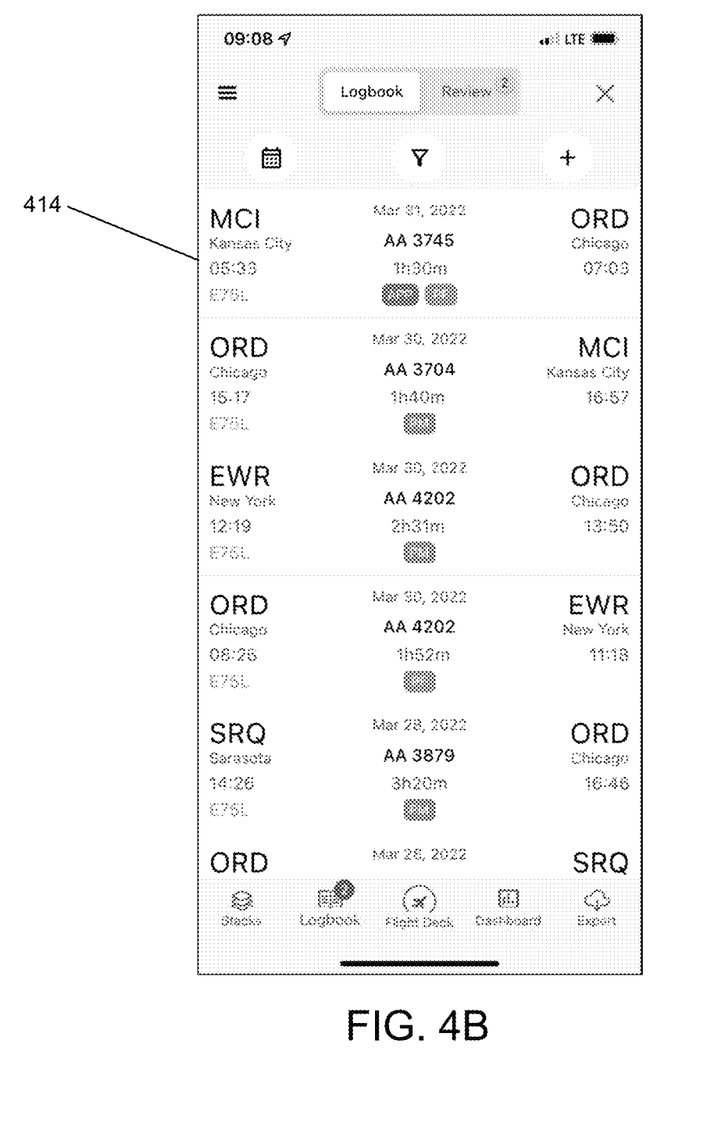
FIG. 4B is screenshot of a logbook view of the mobile application.

Referring to FIGS. 3, 4A, and 4B, the illustrated mobile application is configured to generate several different application views that facilitate user interaction with the mobile application. A flight deck view 310 provides a status indicator 312 that indicates whether the mobile device is currently on the ground (as shown), in flight (not shown) and in route (not shown). As explained in further detail below, the mobile application runs a background process that keeps this status indicator 312 current. The illustrated flight deck view 310 further includes a listing of recent flights 314. The recent flights listing 314 shows recently added flight records, stored in the flight record database 40. FIG. 3 depicts a triangular caution sign next to one of the recent flights in the listing 314. The caution sign indicates that the recent flights, while detected and stored by the mobile application, have not yet been confirmed by the user. The application requires user confirmation of each application-determined flight to ensure that the user was actually present in a required crew member capacity on any flight. A checkmark sign is presented next to each recent flight that has been confirmed by the user.

FIG. 4A depicts an exemplary embodiment of a review section 412 of the mobile application. FIG. 4B depicts an exemplary embodiment of a logbook section 414. The review section, contains a list of all flight records stored in the database 40, which require user input confirming or deleting the flight. The logbook section 414 contains a list of all the confirmed flight records stored in the logbook 44. In the review section 412, each flight record is shown in an active display item 416. The user can select the display item 416 for each flight to call up a screen (not shown) allowing the user to manually edit flight details. In the illustrated embodiment, the set of action items includes an approve item 418 when the user swipes right on the active display item 416, and a delete item 420 when the user swipes left on the active display item 416. Selecting the approve item 418 changes the state of the respective flight from a review state to an approved state in the digital logbook 40. Selecting the delete item 420 causes the mobile application to change the state of the respective flight from a review state to a deleted state. This will remove the flight from the review screen 412 without permanently deleting the flight record from the flight database 40, allowing such flights to be restored.

In some embodiments, the mobile flight log application can include a feature to filter a plurality of flights based on desired filtering criteria. Additionally, the mobile flight log application may include an import and export feature. The import feature can be made to pull, store, and display flight information from a comma separated value (CSV) file.

Referring to Table 1 below, the illustrated mobile application maintains a data structure 110 on local memory of the mobile device 12 that stores various information used by the mobile application to recognize or determine aircraft takeoffs and landings as they occur. The illustrated data structure 110 includes a set of read-only parameters 112, 114, 116, 118, 120, 122, 124, 144 and a set of dynamic read/write parameters, 126, 128, 130, 132, 134, 136, 138, 140, 142 that enable the mobile application to determine when a takeoff and a landing have occurred. The read-only parameters are defined by the administrator of the application and, in the illustrated embodiment, include an airport radius parameter 112, a minimum average flight speed parameter 114, an airport validation time interval parameter 116, an airport validation consecutive location parameter 118, a GPS location accuracy threshold parameter 120, a GPS speed accuracy threshold parameter 122, and a minimum instantaneous flight speed parameter 124. The read/write parameters can be written by the application during use and, in the illustrated embodiment, include a new airport parameter 126, a validated current airport parameter 128, a takeoff flag parameter 130, a departure time parameter 132, an arrival time parameter 134, a departure date parameter 136, an arrival date parameter 138, a departure airport parameter 140, arrival airport parameter 142, and current time parameter 144.

TABLE 1

Mobile Application Data Structure 110

| Parameter | Type | Description | Value |
|---|---|---|---|
| Airport radius 112 | Read only | Defines a maximum radius around any known airport location within which GPS locations are treated as being located at the airport in question. | Number of miles (e.g., 3 miles) |
| Min. avg. flight speed 114 | Read only | Defines the minimum average speed of travel between two validated airport stations that the application must observe in order to determine a takeoff and a landing have occurred. | Numerical speed in mph (e.g., 90 mph) |
| Airport validation time interval 116 | Read only | Defines the minimum amount of uninterrupted time that the mobile application must observe, based on GPS, that the mobile device is located at the same airport before recognizing the airport as a validated airport station. | Number of minutes (e.g., 3 minutes) |
| Airport validation consecutive locations 118 | Read only | Defines the minimum number of consecutive GPS readings at an airport location before the mobile application will recognize the airport as a validated airport station. | Number of consecutive locations at airport location (e.g., 5 consecutive airport locations) |
| GPS location accuracy threshold 120 | Read only | Defines the maximum real-time GPS location accuracy figure (determined/provided by native mobile device GPS) at which the mobile application will rely on GPS location data from the mobile device. | Number in meters (e.g, 2000 m) |
| GPS speed accuracy threshold 122 | Read only | Defines the maximum real-time GPS speed accuracy figure (determined/provided by native mobile device GPS) at which the mobile application will rely on instantaneous GPS speed from the mobile device. | Range of acceptable values in m/s (e.g., 0-to-50 m/s) |
| Minimum instantaneous flight speed 124 | Read only | Defines the minimum real-time horizontal speed at which the mobile application will determine that a takeoff has occurred for purposes of setting the takeoff flag. | Number indicative of speed (e.g., 100 mph) |
| New airport 126 | Read/write | Code for most recent airport at which the mobile device is determined to be located based on GPS | IATA location identifier |
| Current validated airport station 128 | Read/write | Code for most recent validated airport station. | IATA location identifier |
| Takeoff flag 130 | Read/write | Indicates whether mobile application currently believes the mobile device is in-flight, based on an instantaneous speed measurement. | Binary value |
| Departure time 132 | Read/write | Indicates time at which mobile application determined the mobile device to have departed on a flight based on either instantaneous speed measurement or last time at which GPS indicated mobile device located at current validated airport station | Time |
| Departure date 134 | Read/write | Indicates date when mobile application determined the mobile device to have departed on a flight based on either instantaneous speed measurement or last time at which GPS indicated mobile device located at current validated airport station | Date |
| Arrival time 136 | Read/write | Indicates time at which mobile application determined the mobile device to have arrived at an arrival airport from a flight based on first time GPS indicated mobile device located at current validated airport station | Time |
| Arrival date 138 | Read/write | Indicates date when mobile application determined the mobile device to have arrived at an arrival airport from a flight based on first time GPS indicated mobile device located at current validated airport station | Date |

TABLE 1-continued

Mobile Application Data Structure 110

| Parameter | Type | Description | Value |
|---|---|---|---|
| Departure airport 140 | Read/write | Memory location for indicating departure airport | IATA location identifier |
| Arrival airport 142 | Read/write | Memory location for indicating arrival airport | IATA location identifier |
| Current time 144 | Read only | Indicates current time and date for use in setting departure/arrival times/dates | Time/date |

The illustrated mobile application is configured to use mobile device GPS to make assessments of whether the mobile device 12 is stationed at an airport location. Making these assessments requires the mobile application to include or have access to a set of known airport locations. In one or more embodiments, a database of known airport locations is stored in local memory on the mobile device. In certain embodiments, a database of known airport locations is stored in memory associated with the remote server. In still other embodiments, a database of known airport locations can be maintained by a third party and stored in a third party data structure that is accessible to the mobile application and/or server. However, the airport locations are stored, the illustrated mobile application is configured to access the database of airport locations. The application is capable of determining whether a GPS location is within the defined airport radius (set by parameter 112) from one of the airport locations in order to assess whether the mobile device is located, and ultimately stationed, at an airport location.

Figure 2:
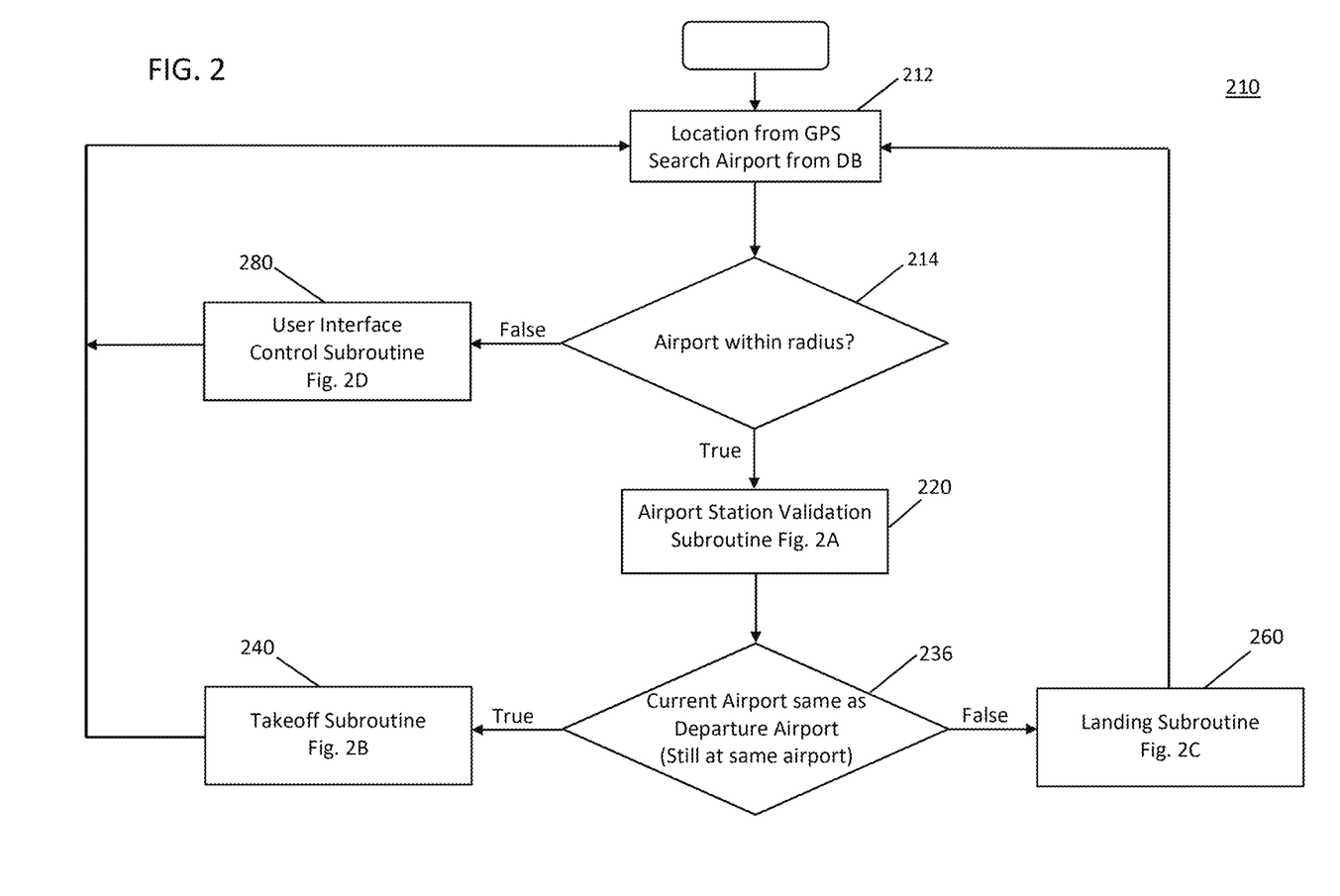
FIG. 2 is a flow chart of exemplary steps and decision points of a process of automatically tracking flights as they occur using a mobile device running the mobile flight logging application.

Referring now to FIG. 2, an exemplary process by which the system 10 automatically tracks takeoffs and landings is generally indicated at reference number 210. The illustrated process 210 is driven by periodically receiving GPS locations from the mobile device GPS (step 212). Each time a new GPS location is received, the mobile application assesses whether the location is within the defined airport radius 112 from any airport location stored in the database of known airport locations (decision point 214). If so, the mobile application determines that the mobile device is located at an airport location and proceeds to conduct an airport station validation subroutine 220. As explained more fully below, the mobile application uses the airport station validation subroutine 220 to validate that the mobile device becomes stationed at a new airport location, rather than merely passing through the airport location during transit. Depending on whether or not the mobile application has already detected a departure airport (e.g., whether or not there is a current non-null value for the departure airport parameter 140), the mobile application is configured to conduct a takeoff subroutine 240 or a landing subroutine 260 by which the mobile application stores an indication of a takeoff in memory (e.g., writes values for the departure time parameter 132, the departure date parameter 134, and the departure airport parameter 140) or by which the mobile application stores an indication of a landing in memory (e.g., writes values from the arrival time parameter 136, the arrival date parameter 138, and the arrival airport parameter 142). If at decision point 214 the GPS location determined in step 212 is not within the predefined radius from a known airport location, the process 210 proceeds to a user interface control subroutine 280 that operates in the background to update the user interface status indicator 312 provided by the mobile application.

Figure 2A:
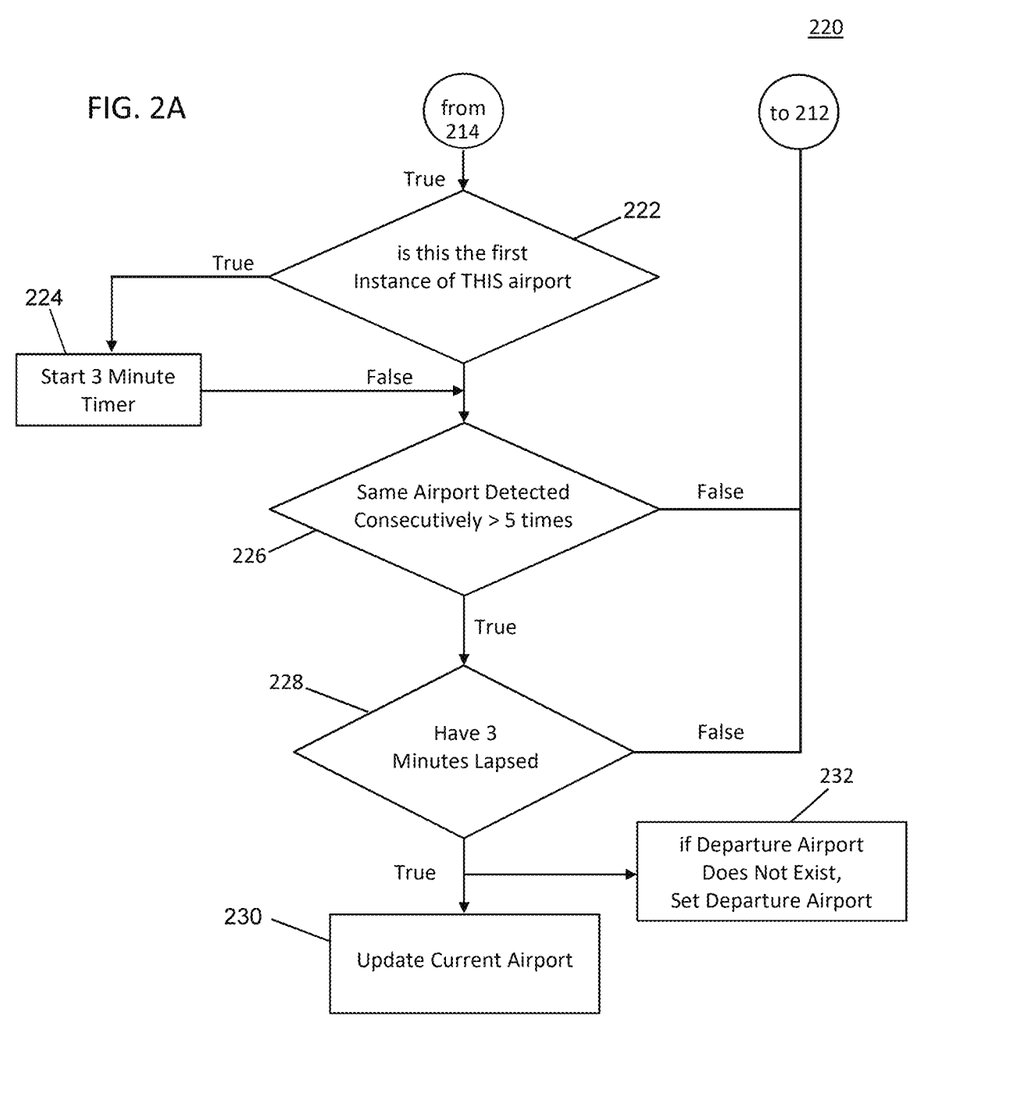
FIG. 2A is a flow chart of steps and decision points of an airport station validation subroutine of the process of FIG. 2.

Referring to FIG. 2A, each time the mobile application detects that the mobile device has arrived at a new airport location, the mobile application uses the airport station validation subroutine 220 to validate that the mobile device is stationed at the new airport location, rather than merely passing through the airport location during transit. Initially, when a new airport location is detected (see decision point 222), the mobile application writes the airport location to memory as a new airport parameter 126 and starts a timer (step 224). Subsequently, the mobile application is configured to refrain from updating the current validated airport station parameter 128 until (i) the mobile device receives a consecutive number of GPS locations at the new airport location 126 that reaches or exceeds the airport validation consecutive locations parameter 118 (decision point 226) and (ii) the mobile device receives a GPS location at the new airport location 126 after the timer reaches or exceeds the airport validation time interval parameter (decision point 228). When both validation criteria (i) and (ii) have been met, the mobile application writes the airport location to the current validated airport station parameter 128 (step 230). Additionally, if the departure airport parameter 140 is currently null, the mobile application writes the airport location to the departure airport parameter 140 (step 232).

Referring again to FIG. 2, after completing the airport station validation subroutine 220, the mobile application assesses whether the current validated airport station defined in parameter 128 equals the departure airport defined in parameter 140 (decision point 236). If the two parameters 128, 140 are the same, the mobile application proceeds to the takeoff subroutine 240. If the two parameters 128, 140 differ, the mobile application proceeds to the landing subroutine 260.

Figure 2B:
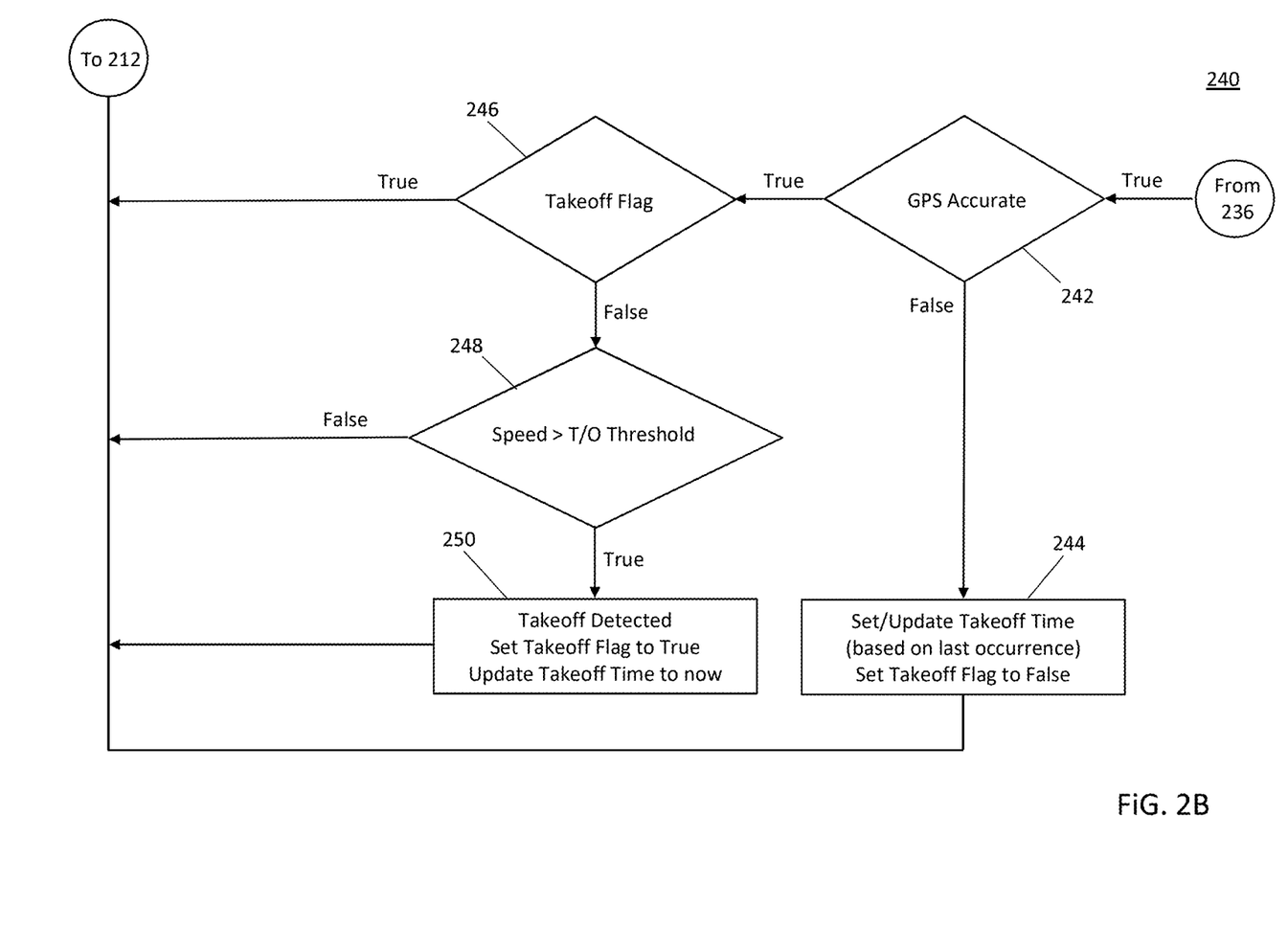
FIG. 2B is a flow chart of the steps and decision points of a takeoff subroutine of the process of FIG. 2.

Referring to FIG. 2B, the takeoff subroutine 240 is broadly configured to store an indication of a takeoff in memory on the mobile device. In the illustrated embodiment, the takeoff subroutine 240 begins by determining whether the GPS signal is accurate based on the GPS location accuracy threshold 120 (decision point 242). If at decision point 242 the GPS is determined not to be accurate, the mobile application stores a departure time parameter 132 and departure date parameter 134 based on the time and date at which the GPS location last indicated that the mobile device was located at the airport location stored as the current validated airport station in parameter 128 (step 244). If at decision point 242 the GPS is determined to be accurate, the mobile application assesses whether the takeoff flag parameter 130 is currently true or false (decision point 246). If the takeoff flag parameter 130 is currently false, the mobile application determines whether the current speed indicated by GPS is greater than the minimum instantaneous flight speed parameter 124 (decision point 248). If so, the mobile application detects a takeoff by setting the takeoff flag parameter 130 to true and writing the current time and date for the departure time and date parameters 132, 134 (step 250).

Referring again to FIG. 2, after the takeoff subroutine 240 is complete and the mobile application stores an indication of a takeoff in memory, the process returns to step 212 and continues to receive periodic GPS locations from the mobile device while in-flight. But while the mobile device is in flight, it will not be possible to satisfy the conditions of decision points 214, so the current validated airport station 128 will not be updated while the flight is in progress. Hence, after a takeoff and before landing, the mobile application prevents itself from initiating another takeoff subroutine 240 or landing subroutine 260, until a landing actually occurs.

When a landing occurs, an initial GPS location will occur within the predefined airport radius 112 from a new airport location. Thus, the mobile application will change the new airport parameter 126 accordingly. Further, the mobile device GPS will continue to register locations at the new airport location for the required airport validation consecutive locations 118 and the required airport validation time interval 116 (see decision points 226, 228), thus enabling the mobile device to proceed to update the current validated airport station parameter 128 (step 230). Upon a landing, the departure airport parameter 140 will have a non-null value, and so the mobile application does not write a new departure airport to memory (see step 232). Thus at decision point 236, the current validated airport station 128 is not the same as the departure airport 140, and the process 210 proceeds to the landing subroutine 260.

Figure 2C:
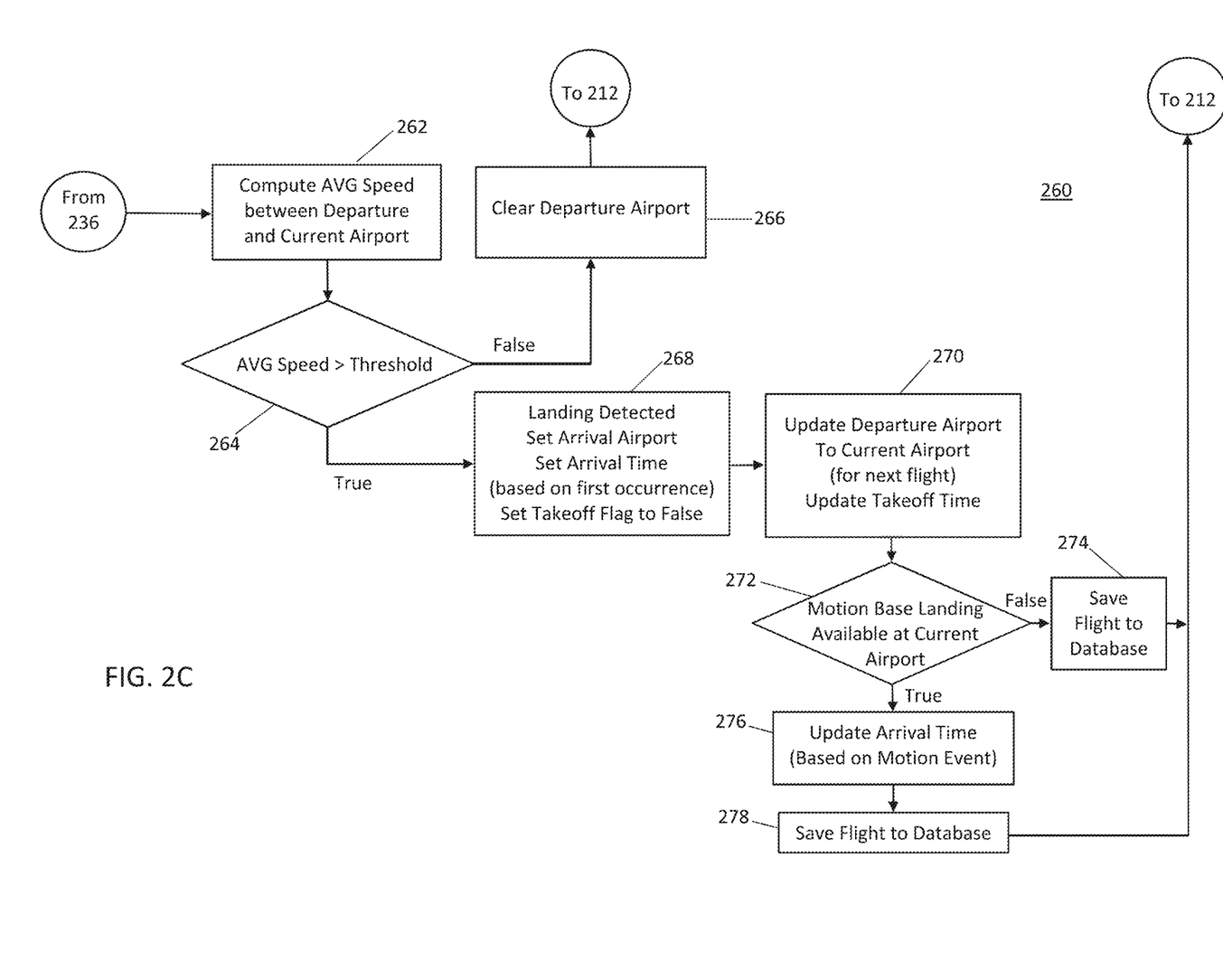
FIG. 2C is a flow chart of the steps and decision points of a landing subroutine of the process of FIG. 2.

Referring to FIG. 2C, when the landing subroutine 260 begins, at step 262, the mobile application computes an average speed between the departure airport and the current airport. To make this calculation the mobile application determines the distance between the airport written to the departure airport parameter 140 and the airport written to the current validated airport station parameter 128 and divides by the difference in time between the time written into the departure time parameter 132 and the first time at which the GPS registered a location at the current validated airport station. If at decision point 264 the determined average speed is greater than the minimum average flight speed parameter 114, the mobile application determines that a flight has occurred. If at decision point 264 the determined average speed is less than the minimum average flight speed parameter, the mobile application determines that no flight has occurred. Thus, at step 266, the mobile application clears or nulls the departure airport parameter 140 so that the airport written to the current validated airport station parameter 128 will be written to the departure airport parameter 140 upon completion of the next cycle of the airport station validation subroutine 220.

If at decision point 264 the determined average speed in step 262 is found to be greater than the minimum average flight speed parameter 114, the mobile application writes new values for the arrival time parameter 136, the arrival date parameter 138, and the arrival airport parameter 142 (step 268). The arrival time and date values are based on the first time at which the GPS detected the mobile device location at the current validated airport station 128.

In one or more embodiments, the landing subroutine 260 provides a secondary criterion for improving the accuracy of the arrival time parameter 136. At decision point 272, the mobile application determines whether a landing was detected at the current validated airport station based on detected motion of the mobile device. The mobile device suitably includes one or more inertial sensors that can be used to detect instantaneous horizontal speed, vertical speed, and altitude. In the illustrated embodiment, at decision point 272, the mobile application determines whether the detected horizontal speed, vertical speed, and/or altitude indicated a landing at the current validated airport station (e.g., whether horizontal speed, vertical speed, and/or altitude fell below predefined thresholds or changed at a rate above a predefined rate of change threshold). If a landing was detected based on these motion signals (decision point 272 found to be true), the mobile application can update the arrival time and date parameters 136, 138 based on the landing time detected by way of the motion signals (step 276). If not, the mobile application uses the GPS-derived arrival time and date parameters 136, 138 previously written to the data structure 110 in step 268. Upon completion of the landing subroutine 260, the mobile application is configured to use the parameters 132, 134, 136, 138, 140, 142 to query a third-party flight record database 44 for flight information about a corresponding flight and then store the retrieved flight information in the database 40 (steps 276, 278).

Upon completion of the illustrated landing subroutine 260, the mobile application is configured to make an assumption that the arrival airport for the just-completed flight will become the departure airport for a next flight. Thus, in step 270, the mobile device will update the departure airport parameter 132 to match the current validated airport station parameter 128 and clear the arrival airport parameter 142. In the event that the user does not ultimately depart from the current airport on another flight, the mobile application will recognize this because the next time a new airport is written as a current validated airport station 128 (e.g., when the user drives to another airport), the result of average point-to-point speed assessment in decision point 264 will be false, causing the mobile application to clear the departure airport 140 at step 266.

Figure 2D:
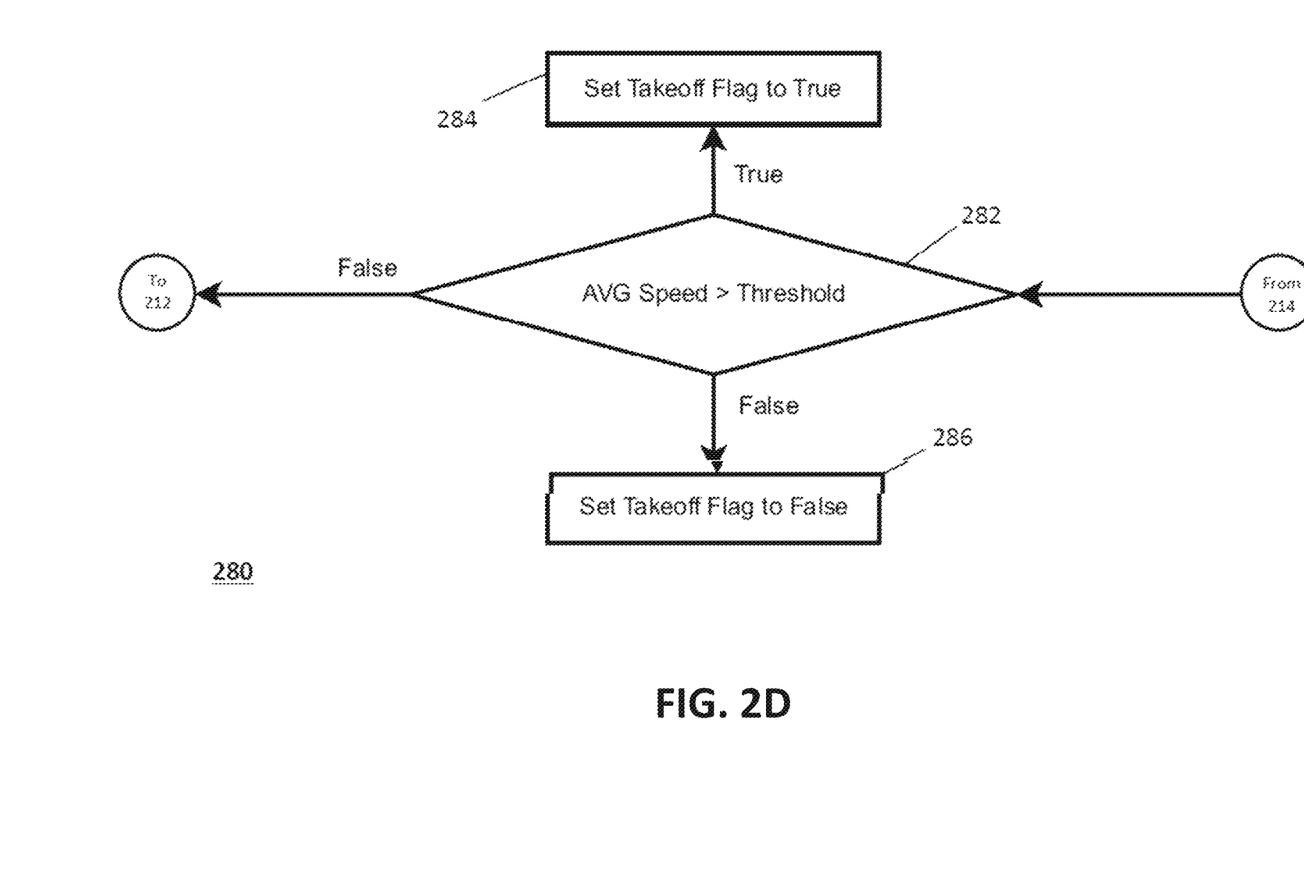
FIG. 2D is a flow chart of the steps and decision points of a user interface control subroutine of the process of FIG. 2.

Throughout the process 210, the mobile application runs a background subroutine 280 that facilitates updating status information displayed on the flight deck view 310 of the mobile application shown in FIG. 3. Whenever the GPS does not indicate that the mobile device is located at an airport location, the mobile application determines whether the current instantaneous speed is greater than the speed defined by the minimum instantaneous flight speed parameter 124 (decision point 282). If so, the mobile application sets the takeoff flag parameter 130 to true, which causes the status indicator 312 to switch to an 'in-flight' graphic (not shown) (step 284). When the instantaneous speed is determined to be less than the threshold speed parameter 124, the mobile application sets the takeoff flag parameter 130 to false (step 286), which causes the status indicator 312 to display an 'On Ground' graphic as shown in FIG. 3.

The process 210 described above enables the mobile device to detect when a takeoff and landing of a flight occur. As explained above, the landing subroutine 260 of the process 210 concludes with the mobile application saving a flight record to the flight record database 40. In the illustrated embodiment, this process comprises the server 32 querying the third-party flight record database 44 to determine an official flight record that most closely matches the takeoff and landing data generated based on the process 210. The server then updates the flight record database 40 to include the official flight record information from the database 44 for the flight in question.

As explained above, before accepting any flight into the logbook, the mobile application awaits confirmation from the user. For example, in the illustrated embodiment, the mobile application requires the user to interact with the review screen 412, in particular approving each flight that the user would like to have entered into the logbook.

The inventors believe that the illustrated flight logging system 10 can greatly simplify the process of logging flight hours for flight crew members. By leveraging the GPS capabilities of ubiquitous mobile devices, the system creates a mechanism for automatically creating a record of every flight on which an individual travels. The inventors have tested the above-described system 10 and found it to be highly accurate at detecting flights as they occur. Moreover, through testing, the inventors have found that the above-described system generates minimal false indication of flights having occurred. Still further, the system introduces the human user into the loop before making a logbook record. Combining the approval process with the automatic augmentation of third-party flight data provides added layers of certainty that the flight logbook maintained by the mobile application will have high accuracy.

In the preferred embodiment, the mobile flight log application uses a representational state transfer (REST) application programming interface (API). REST is the industry standard software architecture for interactive applications mobile, web-based, or otherwise. The mobile flight log application 10 uses the REST API to get a JavaScript Object Notation (JSON) response from the third-party flight data source 44. JSON is a derivative of the popular programming language JavaScript that uses human-readable language to make attribute-value pairs and data arrays. As known to those skilled in the art, other software architectures and programming languages with requesting and receiving capabilities from a third-party database may be used without departing from the scope of the present disclosure. After the official flight information is received by the mobile flight log application, the mobile flight log application's server logic computes any remaining flight information to be entered into the digital logbook 40, including but not limited to night time and instrument time.

In the preferred embodiment, the mobile flight log application 10 is configured to operate through at least one or both, locally on the mobile device 12 and/or through a remote network of servers. One with skill in the art would understand that the mobile device 12 on which the mobile flight log application 10 operates also includes a central processing unit, memory, and a permanent storage such as a solid-state drive. In the preferred embodiment, memory may store program code for the mobile flight log application 10. Memory may routinely store indications of the determined aircraft takeoff and indication of the determined aircraft landing. Additionally, memory may also store the operating system for the mobile device (e.g., iOS, Android Pie, Google Android OS, etc.). The logging routines may also be loaded from the permanent storage in which they are stored when the mobile flight log application is not in use.

The mobile flight log application of the preferred embodiment provides a web service proxy which listens for and responds to web service requests. In one example, the web service proxy listens for and responds to web service requests using REST API. However, other web service methodologies such as SOAP or XML are within the scope of the present disclosure. In the preferred embodiment, the mobile flight log application and web service uses JSON which relies upon Firebase by Google for general web support. As known to one skilled in the art, other cloud-based web hosting services, such as Amazon Web Services, and other non-cloud-based hosting web server software, such as Apache, can be used without departing from the scope of the present disclosure. The mobile flight log application can include authentication 42 of the user with a corresponding web service. As known to one skilled in the art, the user's credentials for the mobile flight log application can be provided to the remote network of servers 32, as shown in FIG. 1, via the web service proxy.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

In exemplary described above, the exemplary computing system environment is a mobile computing system comprising one or more mobile devices. Exemplary mobile devices comprise a processor, a memory device, an electronic visual display and a sensor (e.g., a GPS sensor). The mobile computing device may comprise a mobile phone (e.g., a smartphone) or a tablet computer.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A method of logging flight time in a digital logbook, the method comprising:
    determining, via a mobile device of a user, that an aircraft takeoff and an aircraft landing have occurred, wherein said determining comprises:
        via a mobile application executing in background on a mobile device:
            periodically receiving at the mobile application geographic coordinates from an onboard GPS of the mobile device; and
            comparing each received geographic coordinates with a database of known airport locations to determine whether the received geographic coordinates are within a defined airport radius from an airport location stored in the database of known airport locations;
        based on said comparing, validating the mobile device is stationed at a first airport location at a first time and validating the mobile device is stationed at a second airport location at a second time;
        determining a distance from the first airport location and the second airport location, a duration from the first time to the second, and an average speed by dividing said distance by said duration;
        comparing said average speed to a predefined average flight speed threshold stored in a data structure of the mobile application on local memory of the mobile device;
        determining the average speed is greater than the predefined average flight speed threshold;
        wherein the determination that the aircraft takeoff and the aircraft landing have occurred is made upon said determining the average speed is greater than the predefined average flight speed threshold;
    storing in the local memory an indication of the determined aircraft takeoff and an indication of the determined aircraft landing;
    requesting, via the mobile device, based on the indication of the determined aircraft takeoff and the indication of the determined aircraft landing, confirmation of whether the user was a required flight crew member on a flight including the determined aircraft takeoff and the determined aircraft landing, wherein said requesting comprises displaying an interactive display on a display screen of the mobile device including at least one active display item for said flight including the determined aircraft takeoff and the determined landing via which the user can make a user input to confirm whether the user was a required flight crew member on said flight including the determined aircraft takeoff and the determined aircraft landing; and
    receiving user input to the mobile device via the active display item that the user was a required flight crew member and storing a logbook record of the flight in a flight logbook data structure associated with the user.

2. The method as set forth in claim 1, further comprising querying a third-party flight data source for a record of a flight having a takeoff and landing, the takeoff and the landing corresponding to the determined aircraft takeoff and the determined aircraft landing.

3. The method as set forth in claim 2, further comprising receiving the record of the flight, determining flight information from the record, and storing the flight information in the digital logbook.

4. The method as set forth in claim 3, wherein the flight information comprises one or more of (i) a flight number, (ii) official flight times, (iii) an aircraft registration, and (iv) weather data.

5. The method as set forth in claim 1, wherein said validating the mobile device is stationed at the first airport location comprises determining a predefined minimum number of consecutive geographic coordinates are within the defined airport radius from the first airport location.

6. The method as set forth in claim 1, wherein said validating the mobile device is stationed at the first airport location comprises determining consecutive geographic coordinates are within the defined airport radius from the first airport location over a predefined minimum interval of time.

7. The method as set forth in claim 1, further comprising determining an aircraft landing time based on a signal from one or more inertial sensors of the mobile device.

8. The method as set forth in claim 7, wherein storing the indication of the determined aircraft landing comprises storing in the local memory an indication of the determined aircraft landing time and landing location.

\* \* \* \* \*